United States Patent
Joshi et al.

(10) Patent No.: US 9,588,855 B2
(45) Date of Patent: Mar. 7, 2017

(54) MANAGEMENT AND UTILIZATION OF FAULT DOMAINS IN DISTRIBUTED CACHE SYSTEMS

(71) Applicant: PernixData, Inc., San Jose, CA (US)

(72) Inventors: Akhilesh Manohar Joshi, Sunnyvale, CA (US); Deepak Dilip Muley, Santa Clara, CA (US); Bryan Crowe, Santa Clara, CA (US); Satyam B. Vaghani, San Jose, CA (US); Shankar Vilayannur Natarajan, San Jose, CA (US)

(73) Assignee: PernixData, Inc., San Jose, CA (US)

( * ) Notice: Subject to any disclaimer, the term of this patent is extended or adjusted under 35 U.S.C. 154(b) by 127 days.

(21) Appl. No.: 14/693,675

(22) Filed: Apr. 22, 2015

(65) Prior Publication Data

US 2016/0314051 A1 Oct. 27, 2016

(51) Int. Cl.
*G06F 11/00* (2006.01)
*G06F 11/20* (2006.01)
*G06F 12/08* (2016.01)

(52) U.S. Cl.
CPC ...... *G06F 11/2069* (2013.01); *G06F 12/0815* (2013.01); *G06F 2201/805* (2013.01); *G06F 2201/885* (2013.01); *G06F 2212/1032* (2013.01); *G06F 2212/608* (2013.01)

(58) Field of Classification Search
CPC ............. G06F 11/2069; G06F 12/0815; G06F 2201/805; G06F 2201/885; G06F 2212/1032; G06F 2212/608
See application file for complete search history.

(56) References Cited

U.S. PATENT DOCUMENTS

| | | | | |
|---|---|---|---|---|
| 6,859,811 | B1* | 2/2005 | Chandrasekaran | G06F 11/1425 |
| 7,941,698 | B1* | 5/2011 | Aggarwal | G06F 11/1641 714/10 |
| 9,317,509 | B2* | 4/2016 | Karampuri | G06F 17/3007 |
| 2005/0160315 | A1* | 7/2005 | Chandrasekaran | G06F 11/1474 714/15 |
| 2011/0252270 | A1* | 10/2011 | Abraham | G06F 11/1425 714/4.1 |
| 2012/0278801 | A1* | 11/2012 | Nelson | G06F 9/45533 718/1 |
| 2012/0290714 | A1* | 11/2012 | Cohen | G06F 11/00 709/224 |
| 2013/0212577 | A1* | 8/2013 | Nayak | H04L 67/16 718/1 |
| 2014/0059379 | A1* | 2/2014 | Ren | G06F 11/08 714/15 |
| 2014/0122795 | A1* | 5/2014 | Chambliss | G06F 12/16 711/114 |

(Continued)

*Primary Examiner* — Joshua P Lottich
(74) *Attorney, Agent, or Firm* — Gard & Kaslow LLP

(57) ABSTRACT

Fault domains are defined which reflect, either physically or virtually, the topology of a networked computing environment. These defined fault domains are then used to control where cached data is replicated when running in a write back cache mode. Unlike known replication approaches, the present approach replicates such data according to a user's defined data policy and based on the defined fault domains thereby avoiding the user having to keep track of changes in computing system configurations or update their data policy when virtual machines migrate from one host computing system to another.

13 Claims, 17 Drawing Sheets

(56) References Cited

U.S. PATENT DOCUMENTS

| | | | |
|---|---|---|---|
| 2015/0135003 A1* | 5/2015 | Cota-Robles | G06F 11/1666 714/6.3 |
| 2015/0186057 A1* | 7/2015 | Das Sharma | G06F 3/0619 714/6.3 |
| 2016/0077972 A1* | 3/2016 | Pease | G06F 12/0891 711/141 |
| 2016/0246717 A1* | 8/2016 | Patil | G06F 12/0806 |

* cited by examiner

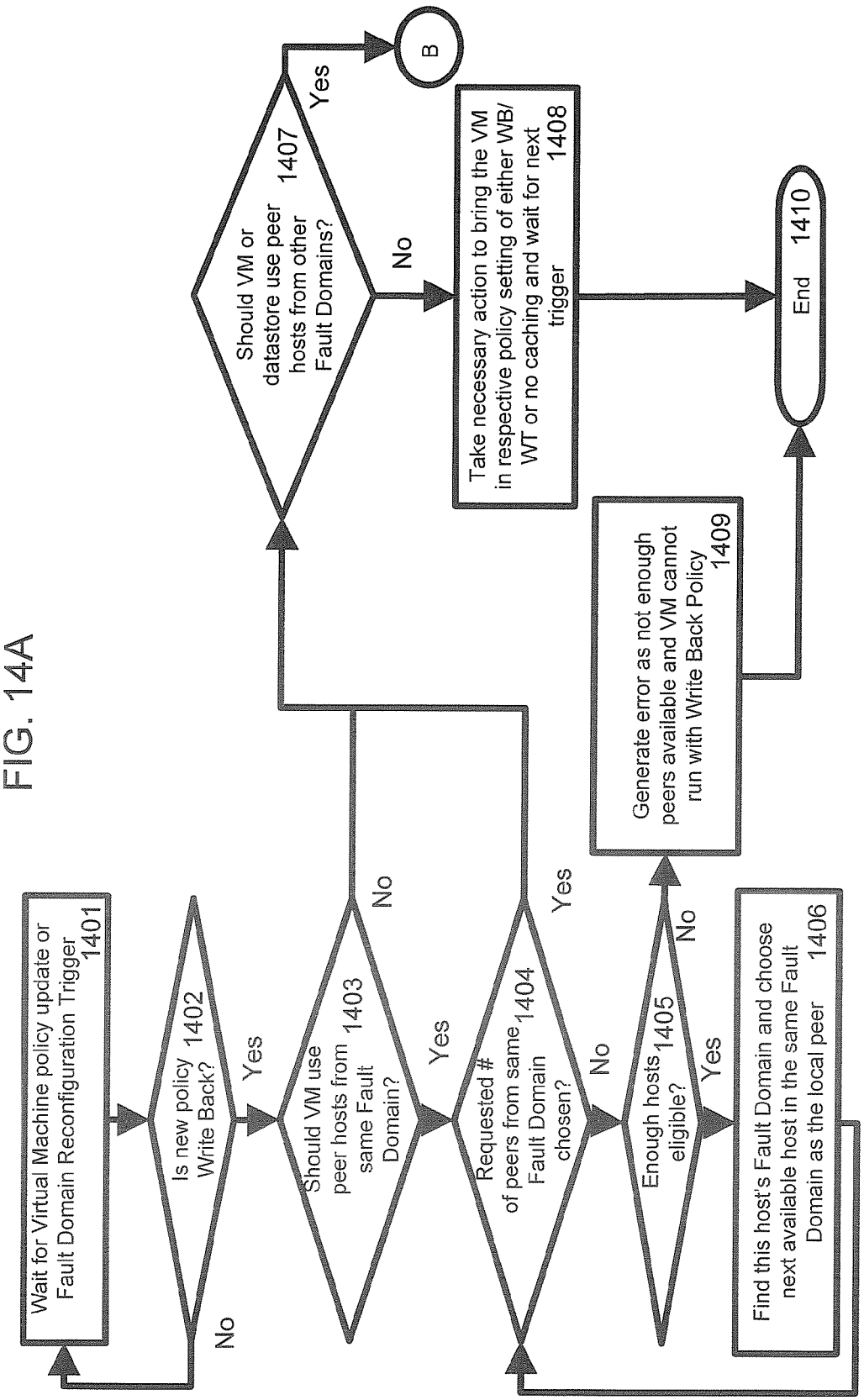

MANAGEMENT AND UTILIZATION OF FAULT DOMAINS IN DISTRIBUTED CACHE SYSTEMS

BACKGROUND

Field

This non-provisional U.S. patent application relates generally to distributed cache data systems and more specifically to managing replication of such cached data in such systems.

Description of Related Art

In computing systems, a cache is a memory system or subsystem that transparently stores data so that future requests for that data can be served faster. As an example, many modern microprocessors incorporate an instruction cache holding a number of instructions; when the microprocessor executes a program loop where the same set of instructions are executed repeatedly, these instructions are fetched from the instruction cache, rather than from an external memory device at a performance penalty of an order of magnitude or more.

In other environments, such as where a computing system hosts multiple virtual machines under the control of a hypervisor, with each virtual machine running one or more applications, caching of objects stored on a network attached storage system can provide significant performance improvements. In some instances, records are cached and then written to the network attached storage system according to a "write back" algorithm. In the "write back" algorithm, the received record is written to the cache before being written to the network attached storage system. The cache system can then direct the writing of the record to the network attached storage system. In other instances, records are synchronously written to the cache and to the network attached storage system according to a "write through" algorithm, typically by writing to the network attached storage before writing to the cache.

When read commands are sent from the virtual machine to the network attached storage, it may be more efficient to read the records from the cache rather than from the network attached storage. While various write-through and write-back caching algorithms exist, caching and retrieving data quickly and accurately remains a challenge.

In some such systems, referred to herein as a distributed cache system, data cached in one computing system is copied to a second computing system, a process known as a replication due to the fact that a replica of the cached data is being created. Having a copy on another computing system provides advantages of alternative, potentially faster response times to future data requests as well as helping to protect against failure scenarios should the first computing system fail.

However, the advantages of replication can be lost when the replication occurs on the same physical machine. This can occur in the modern world of virtual machines that are oftentimes moved from one computing system to another sometimes without the user of the virtual machine even being aware it has happened. The advantages of data replication can also be lost when the replication occurs to a different physical machine that would be equally impacted by a fault affecting the machine from which the data was copied. For example, if both machines were in the same server rack then a power failure to that rack would affect both machines. As another example, if both machines were in the same data center and some disaster occurred at that data center then both machines would be affected. To date, avoiding such faults common to both machines has been dealt with by carefully setting policies for data replication based on knowledge of where the virtual machines are running and awareness of overlapping exposure to such faults. What is needed therefore is a way to ensure a virtual machine user's wishes regarding replication are still met despite the fluidity of movement of virtual machines between computing systems and without the user having to maintain knowledge of such exposure to overlapping faults.

SUMMARY

According to various embodiments, a method comprising: obtaining, by a computing system, a default fault domain configuration, obtaining, by the computing system, a configuration of one or more defined fault domain, obtaining, by the computing system, a specification of one or more host as a member in the one or more defined fault domain, obtaining, by the computing system, a specification of an association between fault domains of the defined fault domain configuration, detecting, by the computing system, an operating fault, determining, by the computing system and based on the detected operating fault, a new fault domain system configuration, reconfiguring on a per host basis, by the computing system and based on the new fault domain system configuration, a specification of which of one or more hosts are to be used for data replication, performing data replication, by the computing system, based on the reconfigured specification of which of the one or more hosts to use for data replication, reconfiguring write back cache data policies, by the computing system, based on receipt by the computing system of a datastore policy update, newly reconfiguring, by the computing system and based on an update to a write back data policy, the specification of which of the one or more hosts are to be used for data replication, and performing data replication, by the computing system, based on the newly reconfigured specification of which of the one or more hosts to use for data replication.

According to various alternative embodiments, a method comprising: determining which host computing systems in a cluster are to be used for replicating data between the host computing systems in the cluster based on: a set of user-specified defined fault domains wherein each defined fault domain includes one or more host computing system as a user-specified member; a system-determined default fault domain wherein the default domain includes all host computing systems not included in one of the defined fault domains as a user-specified member; a user-specified set of associations between the defined fault domains wherein each association defines a unidirectional relationship between one of the defined fault domains as a source of data to be replicated and another of the defined fault domains as a target of data to be replicated; and, a user-specified data policy wherein the data policy specifies how many data replicas are to be made to a local peer host and how many data replicas are to be made to a remote peer host; replicating data between the host computing systems according to the determination of which host computing systems are to be used for data replication; repeating the step of determining when: a new set of defined fault domains is specified by a user; a new set of associations is specified by a user; a new data policy is specified by a user; or, an operational fault in one of the host computing systems is detected; and, repeating the step of replicating data.

BRIEF DESCRIPTION OF THE DRAWINGS

FIG. 14A and FIG. 14B are flowcharts depicting a per virtual machine process of fault domain reconfiguration, according to some embodiments.

DETAILED DESCRIPTION

Replication of data is accomplished in the present approach according to defined fault domains which reflect, either physically or virtually, the topology of a networked computing environment. In particular, defined fault domains are sets of host computing systems that can reflect different physical locations, different server racks, or any other topology of the environment. The fault domains are then used to control where cached data is to be replicated when running in a write back mode. Further, although a defined fault domain can include any host computing system in the environment, in a preferred embodiment each defined fault domain will only include those host computing systems that share a common exposure to some fault, thereby avoiding a fault occurring in one defined fault domain from affecting another defined fault domain thus ensuring the advantages of data replication. Further, unlike known data replication approaches, the present approach replicates such data according to a user's defined data policy (which need not specify specific target host computing systems, as explained further elsewhere herein), and based on the defined fault domains, thereby avoiding the user having to keep track of changes in computing system configurations or environment or update their data policy even when a virtual machine moves from one host to another.

Figure 1:
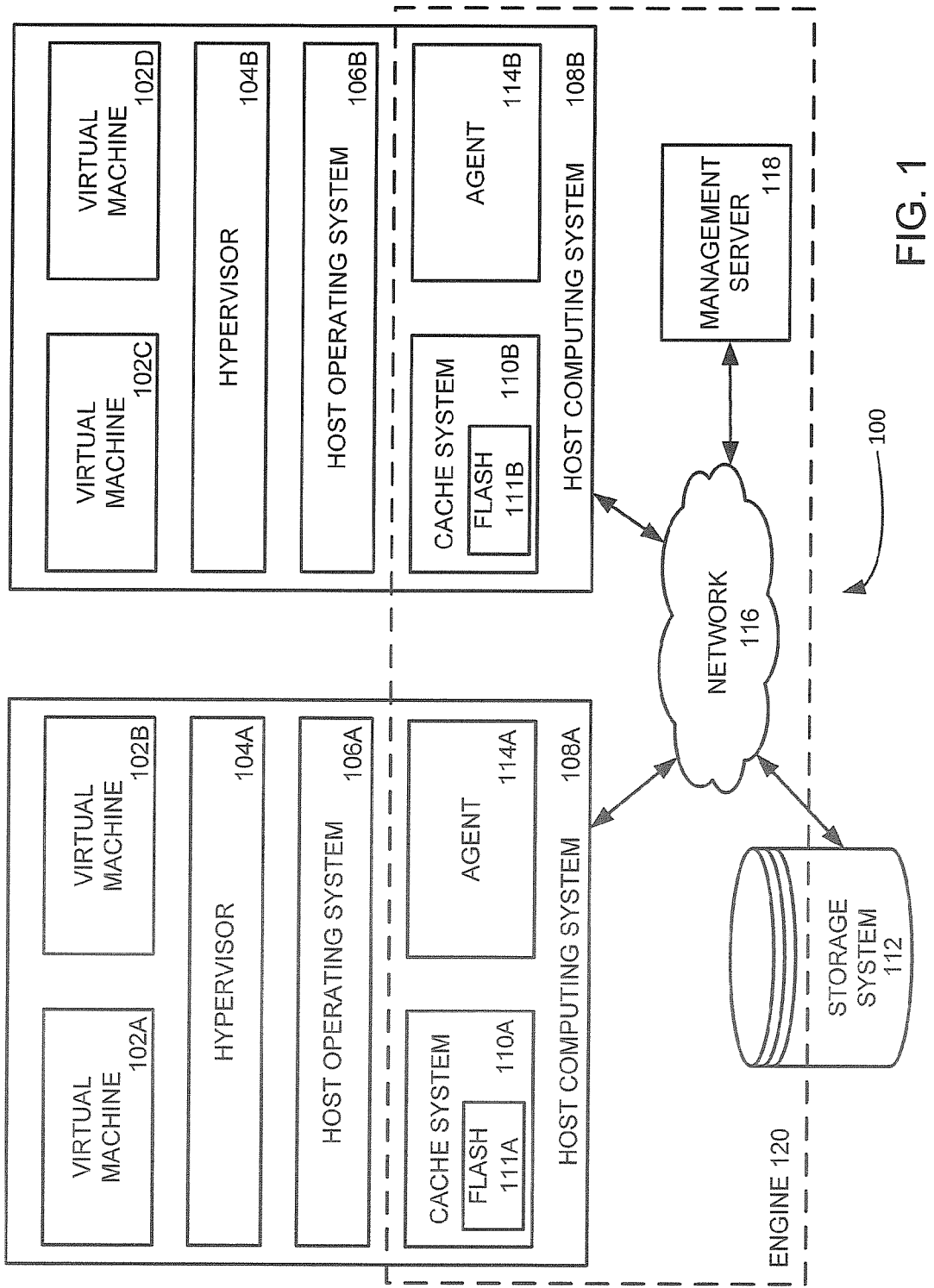
FIG. 1 is a block diagram of a portion of a computing system operating environment in which various embodiments can be practiced.

FIG. 1 is a block diagram of a portion of an environment 100 in which various embodiments of the present approach can be practiced. Referring first to host computing system 108A on the left, the environment 100 comprises one or more virtual machines 102 (denoted 102A and 102B in the figure, and wherein each virtual machine can itself be considered an application) executed by a hypervisor 104A. The hypervisor 104A is executed by a host operating system 106A (which may itself include the hypervisor 104A). The host operating system 106A resides on the physical host computing system 108A having a cache system 110A (it being understood that the cache system could reside within the host operating system rather than being a separate component as shown in the figure). The cache system 110A includes operating logic to cache data within a local memory (as well as a remote memory, as will be explained). The local memory is a faster, more expensive memory such as flash memory 111A. The environment 100 can include multiple host computing systems 108, as is indicated in the figure by host computing system 108A and host computing system 108B. Each of host computing system 108A and 108B are configured to communicate across a network 116 with a storage system 112 to store data (sometimes referred to as a datastore). Network 116 is any known communications network including a local area network, a wide area network, a proprietary network or the Internet. The storage system 112 is a slower memory, such as a hard disk. The environment 100 can include multiple storage systems 112. Examples of storage system 112 include, but are not limited to, a storage area network (SAN), a local disk, a shared serial attached "small computer system interface (SCSI)" (SAS) box, a network file system (NFS), a network attached storage (NAS), and an object store.

Referring to either of host computing system 108A or 108B, when a virtual machine 102 generates a read command or a write command, the application sends the generated command to the host operating system 106. The virtual machine 102 includes, in the generated command, an instruction to read or write a data record at a specified location in the storage system 112. The cache system 110 receives the sent command and caches the data record and the specified storage system memory location. As understood by one of skill in the art, in a write-through cache system, the generated write commands are simultaneously sent to the storage system 112. Conversely, in a write-back cache system, the generated write commands are subsequently sent to the storage system 112 typically using what is referred to herein as a destager.

In some embodiments of the present approach, and as would be understood by one of skill in the art in light of the teachings herein, the environment 100 of FIG. 1 can be further simplified to being a computing system running an operating system running one or more applications that communicate directly or indirectly with the storage system 112.

As also shown in the figure each computing system includes an agent 114 that communicates across the network 116 with a management server 116 to perform various processes and operations described herein. In some instances, the management server 116 working in conjunction with the agent(s) is called an engine 120.

As stated above, cache system 110 includes various cache resources. In particular and as shown in the figure, cache system 110 includes memory such as a flash memory resource 111 (e.g., 111A and 111B in the figure) for storing cached data records (it being understood that, in the present approach, other forms of memory or storage could be used instead of flash memory). Further, cache system 110 also includes network resources (e.g., a network manager) for communicating across network 116.

Such cache resources are used by cache system 110 to facilitate normal cache operations. For example, virtual machine 102A may generate a read command for a data record stored in storage system 112. As has been explained and as understood by one of skill in the art, the data record is received by cache system 110A. Cache system 110A may determine that the data record to be read is not in flash memory 111A (known as a "cache miss") and therefore issue a read command across network 116 to storage system 112. Storage system 112 reads the requested data record and returns it as a response communicated back across network 116 to cache system 110A. Cache system 110A then returns the read data record to virtual machine 102A and also writes or stores it in flash memory 111A (in what is referred to herein as a "false write" because it is a write to cache memory initiated by a generated read command versus a write to cache memory initiated by a generated write command which is sometimes referred to herein as a "true write" to differentiate it from a false write).

Having now stored the data record in flash memory 111A, cache system 110A can, following typical cache operations, now provide that data record in a more expeditious manner for a subsequent read of that data record. For example, should virtual machine 102A, or virtual machine 102B for that matter, generate another read command for that same data record, cache system 110A can merely read that data record from flash memory 111A and return it to the requesting virtual machine rather than having to take the time to issue a read across network 116 to storage system 112, which is known to typically take longer than simply reading from local flash memory.

Likewise, as would be understood by one of skill in the art in light of the teachings herein, virtual machine 102A can generate a write command for a data record stored in storage system 112 which write command can result in cache system 110A writing or storing the data record in flash memory 111A and in storage system 112 using either a write-through or write-back cache approach.

Still further, in addition to reading from and/or writing to flash memory 111A, in some embodiments cache system 110A can also read from and/or write to flash memory 111B and, likewise, cache system 110E can read from and/or write to flash memory 111B as well as flash memory 111A in what is referred to herein as a distributed cache memory system. Of course, such operations require communicating across network 116 because these components are part of physically separate computing systems, namely computing system 108A and 108B.

It is to be further understood that performing such reads between host computing systems across a network can likewise occur when cached data stored in one host computing system has been replicated to another host computing system. With known distributed cache memory systems, users (sometimes called administrators), concerned about possible system failures typically specified which other host computing system were to be used for such replication to thereby avoid or limit the possibility of a single point of failure affecting both the one host computing system and the other host computing system to which the cached data is to be replicated. However, such specification is unlikely to achieve the desired benefits when a given virtual machine moves from one host computing system to another, which can cause the cached data and the replicated data to reside on the same host computing system. With the present approach, by contrast, a more general data policy is used which merely specifies how many replicas are to be kept and how many are to be kept on the same or different host computing systems. Such a data policy is then used in the present approach, in conjunction with the fault domains, to maintain the desired number of replicas across the available host computing systems without need for the user to update the data policy despite changes in the operating environment such as movement of a virtual machine from one host computing system to another or an additional host computing system being added to a fault domain or even a loss (e.g., due to catastrophic failure or natural disaster) causing loss of an entire server rack or fault domain.

Figure 2:
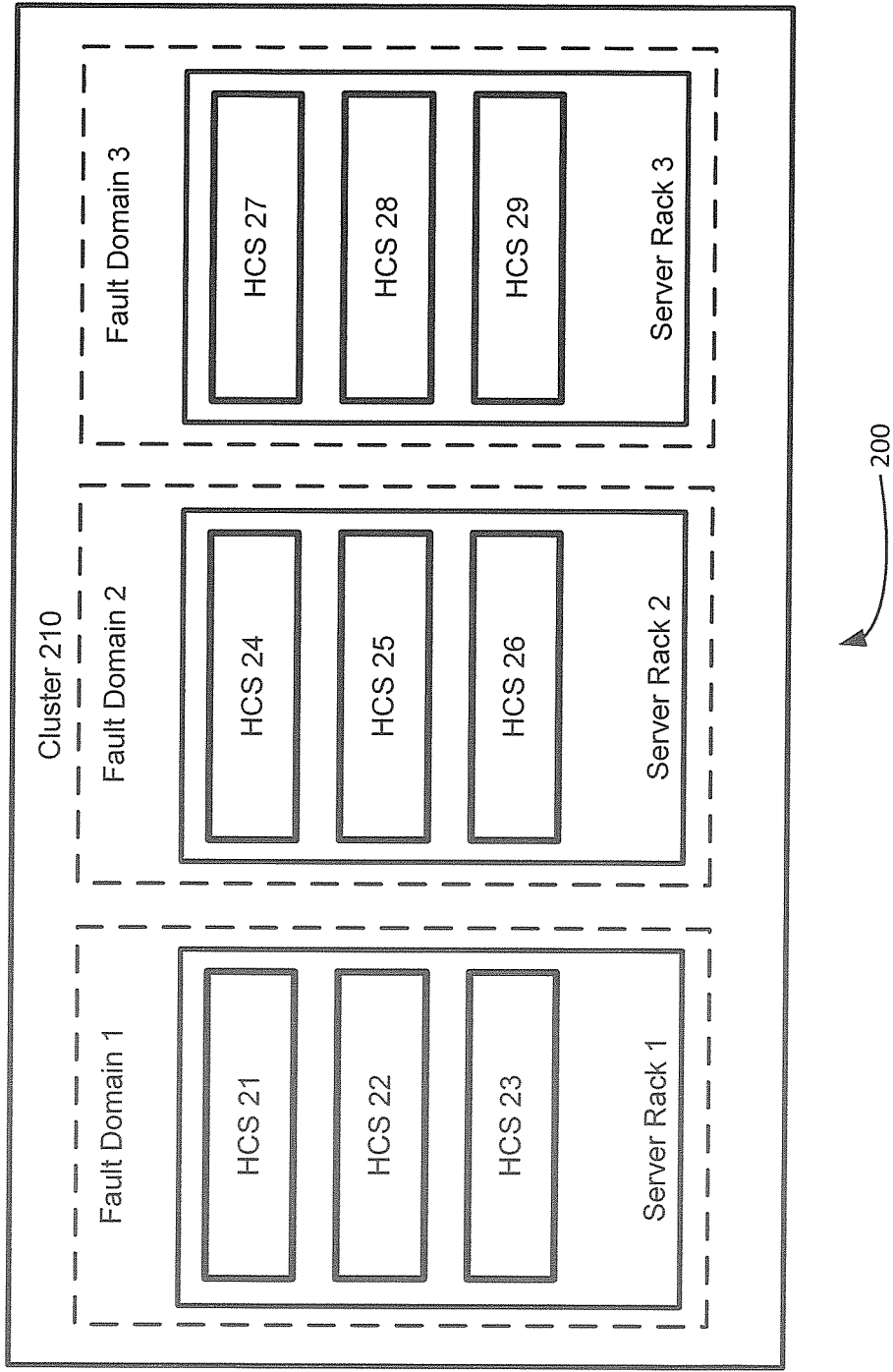
FIG. 2 is a block diagram of a portion of an example environment in which three fault domains have been defined.

FIG. 2 is a block diagram of a portion of an example environment 200 in which three fault domains have been defined. As can be seen, environment 200 includes a cluster 210 comprising multiple server racks each having multiple host computing systems such as host computing system 108A and 108B of FIG. 1. In particular, in this example, rack 1 has host computing system (HCS) 21, host computing system 22 and host computing system 23, rack 2 has host computing system 24, host computing system 25 and host computing system 26, and rack 3 has host computing system 27, host computing system 28 and host computing system 29.

As would understood by one of skill in the art, there can be performance and fault tolerance advantages to replicating data from one host computing system, such as host computing system 21, to another host computing system, such as host computing system 22, in that should there be any bottlenecks or failure in host computing system 21 then the replicated data in host computing system 22 can be accessed instead. However, there still remains the potential for a single point of failure because host computing system 21 and host computing system 22 both reside in the same rack, namely rack 1. As such, to further provide the performance and fault tolerance advantages, it may be desirable to replicate data from one host computing system located in one server rack, such as host computing system 21 located in rack 1, to another host computing system located in another server rack, such as host computing system 24 located in rack 2. This has the advantage that should either host computing system 21 or rack 1 have a failure then the replicated data in host computing system 24 can be accessed instead. However, again, if the user's data policy regarding replication was based on knowledge that the user's virtual machine was running on host computing system 21, and that host computing system 21 is located in rack 1 and that host computing system 22 is located in rack 1 and/or that host computing system 24 is located in rack 2, that data policy would have to be updated when the user's virtual machine moved from host computing system 21 to some other host computing system in the cluster 210. Instead, as explained further elsewhere herein, data policies of the present approach are more general and rely on fault domain definitions to maintain the user's desired level of replication.

Still referring to FIG. 2 it can be seen that there are three fault domains defined in this example. In particular, fault domain 1 corresponds to rack 1, fault domain 2 corresponds to rack 2 and fault domain 3 corresponds to rack 3. As such, in this example, the defined fault domains reflect the physical server rack topology of the three separate racks thereby ensuring that a fault occurring in one server rack does not affect data replicated in another server rack. Of course, as would be understood by one of skill in the art in light of the teachings herein, a fault domain need not be strictly limited to an existing physical topology and as such can comprise any desired combination of host computing systems, server racks, and physical locations.

Continuing with this example of three defined fault domains each having a server rack comprising three host computing systems, and a user running a virtual machine on host computing system 21, should the user have a data policy specifying one replica is to be made to a host computing system in the same fault domain (referred to herein as a "local" peer host) and another replica is to be made to a host computing system in a different fault domain (referred to herein as a "remote" peer host), one replica will be made to either host computing system 22 or host computing system 23, to satisfy the data policy requirement of a local host, and one replica will be made to either host computing system 24, host computing system 25 or host computing system 26 of rack 2 or host computing system 27, host computing system 28 or host computing system 29 of rack 3, to satisfy the data policy requirement of a remote host (predicated upon the user having specified the necessary association, as explained further elsewhere herein). Determining which of these local and/or remote host possibilities to use for replicas is made according to the present approach. Further, dynamic changes in the operating environment 200 likewise trigger revised determinations of such host possibilities according to the present approach. The process of defining fault domains, specifying data policies and associations, and determining which host computing systems are to be used for replication will now be explained in greater detail.

Figure 3:
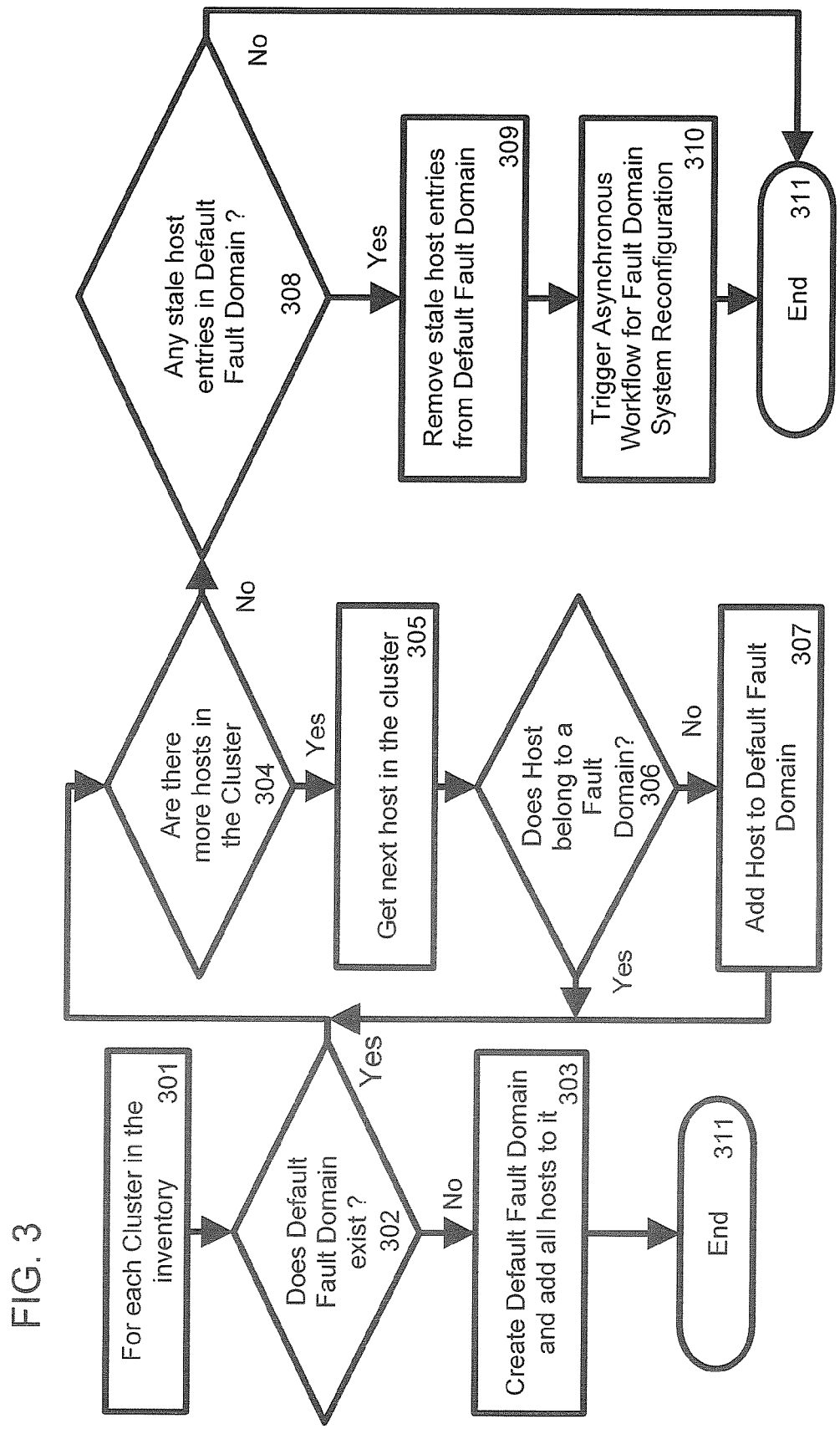
FIG. 3 is a flowchart depicting a process of placing host computing systems into a default fault domain, according to some embodiments.

FIG. 3 is a flowchart depicting a process of placing host computing systems into a default fault domain. A default fault domain is a fault domain that includes all host computing systems in the cluster that are not included in a new defined fault domain. The process of FIG. 3 begins with step 301, which looks at each existing cluster in the operating environment and, for each, makes a determination in step 302 as to whether a default fault domain already exists for that cluster. If the result of the determination in step 302 is that a default fault domain does not yet exist for that cluster then, in step 303, a default fault domain is created and all hosts within that cluster are placed into that newly created default fault domain and the process then finishes at step 311. Alternatively, if the result of the determination in step 302 is that a default fault domain does already exist for that cluster then, in step 304 a determination is made regarding whether there are more hosts in the cluster and, if so, looks at the next host in the cluster in step 305 and then makes a determination in step 306 regarding whether that next host already belongs to a fault domain (either the default fault domain or a user defined fault domain). If the determination in step 306 is that the next host does not already belong to a fault domain then the next host is added to the default fault domain in step 307, otherwise the process returns to step 304. If the determination in step 304 is that there are no more hosts in the cluster then the process continues to step 308 where a determination is made regarding whether there are any stale host entries in the default fault domain. A stale host entry is an entry, in the list or set of host computing systems in the default fault domain, for a host computing system that has been removed from the cluster. If there are no stale host entries in the default fault domain then the process finishes at step 311 otherwise all stale host entries are removed from the default fault domain in step 309. Then, an asynchronous process for reconfiguring the fault domain system is triggered in step 311, as is explained more fully elsewhere herein, and the process finishes in step 311.

In one embodiment, the process of creating a default fault domain is performed by engine 120 of FIG. 1.

Figure 4:
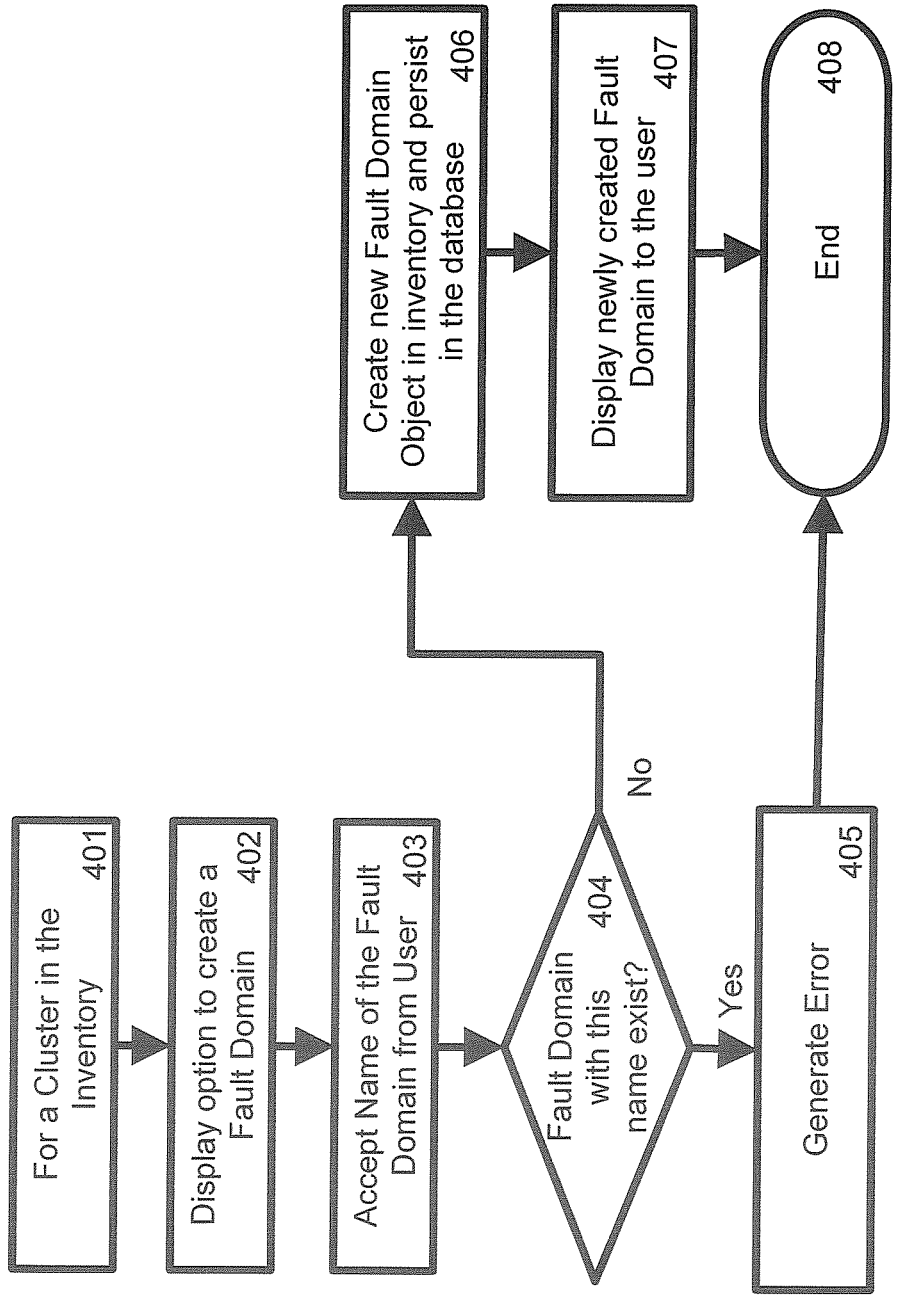
FIG. 4 is a flowchart depicting a process of defining a new fault domain, according to some embodiments.

FIG. 4 is a flowchart depicting a process of defining a new fault domain. A new fault domain is a fault domain that can include any desired host computing system in the cluster and, as has been explained, can reflect an existing data center topology or portion thereof. The process of FIG. 4 begins with step 401, which looks at one existing cluster and then, in step 402, displays an option for a user (e.g., an administrator) to create a new fault domain. Such display can be in any known form such as a selectable menu, tab or button displayed as part of a graphical user interface (GUI). Then, in step 403, a name for the new fault domain is received as input. A determination is then made in step 404 regarding whether the new fault domain name received in step 403 is the same as an existing fault domain name, in which cause an error is generated in step 405, otherwise the process continues to step 406 where the new fault domain and name are created and saved for future use and the new fault domain is then displayed in the GUI in step 407. The process then finishes in step 408.

In one embodiment, the process of defining a new fault domain is performed by engine 120 of FIG. 1.

Figure 5:
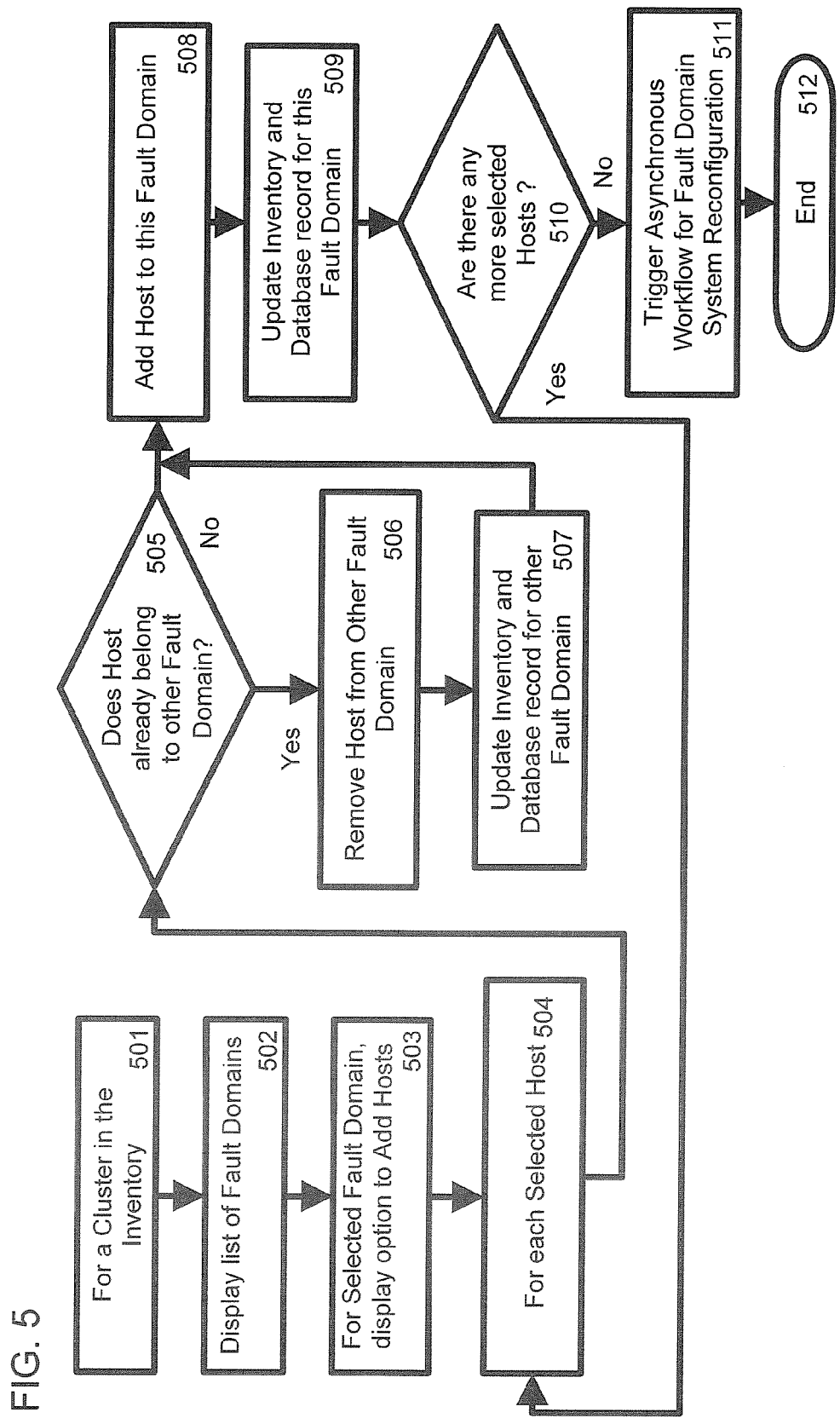
FIG. 5 is a flowchart depicting a process of adding one or more host computing system as a member to a defined fault domain, according to some embodiments.

FIG. 5 is a flowchart depicting a process of adding one or more host computing system as a member to a defined fault domain. Adding one or more host computing system as a member to a defined fault domain ensures it will be treated as part of that defined fault domain when replication hosts are determined and, as has been explained, can reflect an existing data center topology. The process of FIG. 5 begins with step 501, which looks at one existing cluster and then, in step 502, displays a list of defined fault domains for a user to evaluate when considering adding a host computing system to a defined fault domain. Such list can be in any known form of list display known in the art. The process continues with step 503 where, once the user has selected one of the defined fault domains, the process displays an option to add host computing system(s). Then, in step 504, for each host computing system selected by the user, the process continues by making a determination in step 505 regarding whether the selected host computing system already belongs to another defined fault domain and, if it does, then in step 506 removes the selected host computing from that other defined fault domain and in step 507 updates stored values for that other defined fault domain (so that the selected host computing system will no longer be considered a member of that other defined fault domain). The process then continues with step 508, either following step 507 or if the outcome of the determination in step 505 was that the selected host computing system did not already belong to another defined fault domain. In step 508, the process adds the selected host computing system to the selected defined fault domain and in step 509 updates stored values for that selected defined fault domain (so that the selected host computing system will now be considered a member of the selected defined fault domain). A determination is then made in step 510 regarding whether the user has selected any more host computing systems for inclusion as a member in the selected defined fault domain, in which case the process returns to step 504 to repeat the process for the selected more host computing system(s) else the process continues with step 511 where an asynchronous process for reconfiguring the fault domain system is triggered, as is explained more fully elsewhere herein, and the process finishes in step 512.

In one embodiment, the process of adding a host computing system as a member to a new defined fault domain is performed by engine 120 of FIG. 1.

Figure 6:
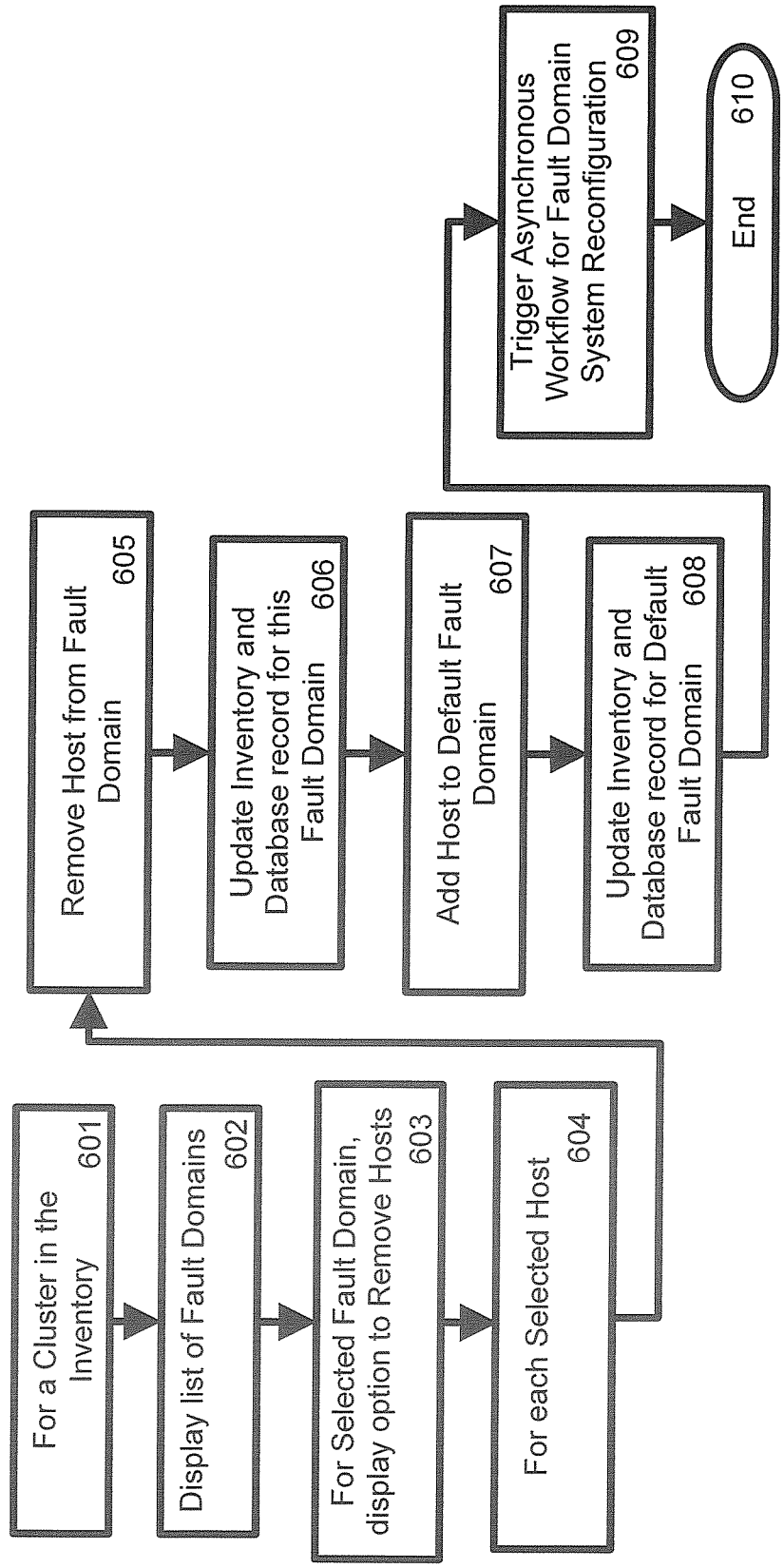
FIG. 6 is a flowchart depicting a process of removing one or more host computing system as a member from a defined fault domain, according to some embodiments.

FIG. 6 is a flowchart depicting a process of removing one or more host computing system as a member from a defined fault domain. Removing one or more host computing system as a member from a defined fault domain ensures it will no longer be treated as part of that defined fault domain when replication hosts are determined and, as has been explained, can reflect a change in an existing data center topology. The process of FIG. 6 begins with step 601, which looks at one existing cluster and then, in step 602, displays a list of defined fault domains for a user to evaluate when considering removing a host computing system from a defined fault domain. Such list can be in any known form of list display known in the art. The process continues with step 603 where, once the user has selected one of the defined fault domains, the process displays an option to remove host computing system(s). Then, in step 604, for each host computing system selected the selected host computing system is removed from the selected defined fault domain, in step 605, and stored values for that selected defined fault domain are updated in step 606 (so that the selected host computing system will no longer be considered a member of that selected defined fault domain). The process then continues with step 607 where the selected host computing system is added to the default fault domain and in step 608 stored values for the default fault domain are updated (so that the selected host computing system will now be considered a member of the default fault domain). Then, an asynchronous process for reconfiguring the fault domain system is triggered in step 609, as is explained more fully elsewhere herein, and the process finishes in step 610.

In one embodiment, the process of removing a host computing system as a member from a new defined fault domain is performed by engine 120 of FIG. 1.

Figure 7:
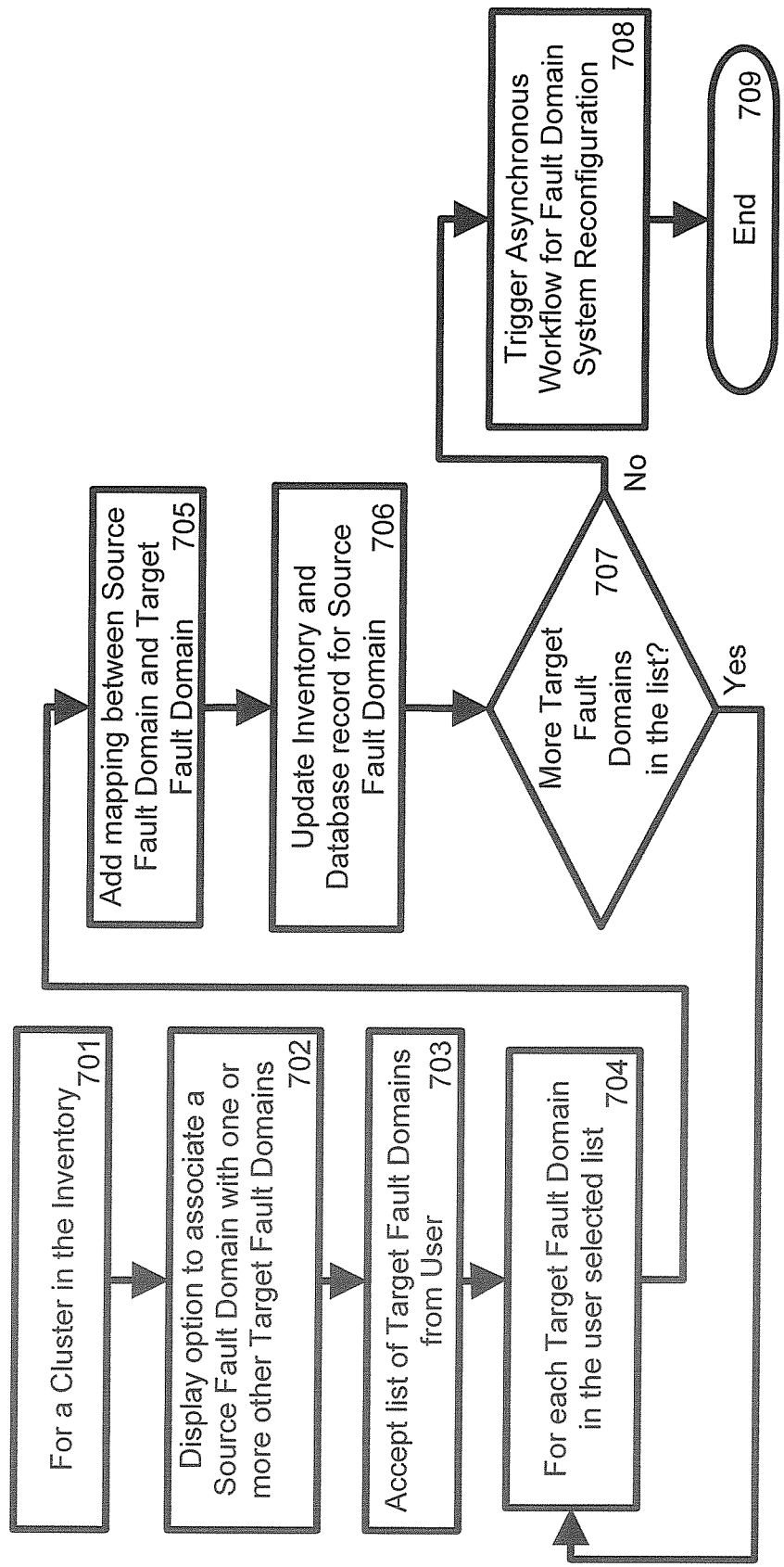
FIG. 7 is a flowchart depicting a process of adding an association between one defined fault domain and one or more other defined fault domain, according to some embodiments.

FIG. 7 is a flowchart depicting a process of adding an association between one defined fault domain and one or more other defined fault domain. An association is a unidirectional mapping from one defined fault domain to another defined fault domain for use when determining possible peer host computing systems for replication purposes as explained further elsewhere herein. The process of FIG. 7 begins with step 701, which looks at one existing cluster and then, in step 702, displays an option to associate one user-selected defined fault domain, as a source fault domain, to one or more other user-selected defined fault domains, as target fault domain(s). Then, in step 703, a list or identification of one or more user-selected target defined fault domains is received as input and then, beginning with step 704 for each such selected target defined fault domain, adds a mapping between the user-selected defined fault domain, as a source fault domain, to the one or more other user-selected defined fault domains and in step 706 updates stored values for the user-selected source fault domain. A determination is then made in step 707 regarding whether there are more user-selected defined fault domains to become target fault domains and, if so, the process returns to step 704. If not, then an asynchronous process for reconfiguring the fault domain system is triggered in step 708, as is explained more fully elsewhere herein, and the process finishes in step 709.

In one embodiment, the process of adding an association between one new defined fault domain and one or more other new defined fault domain is performed by engine 120 of FIG. 1.

Figure 8:
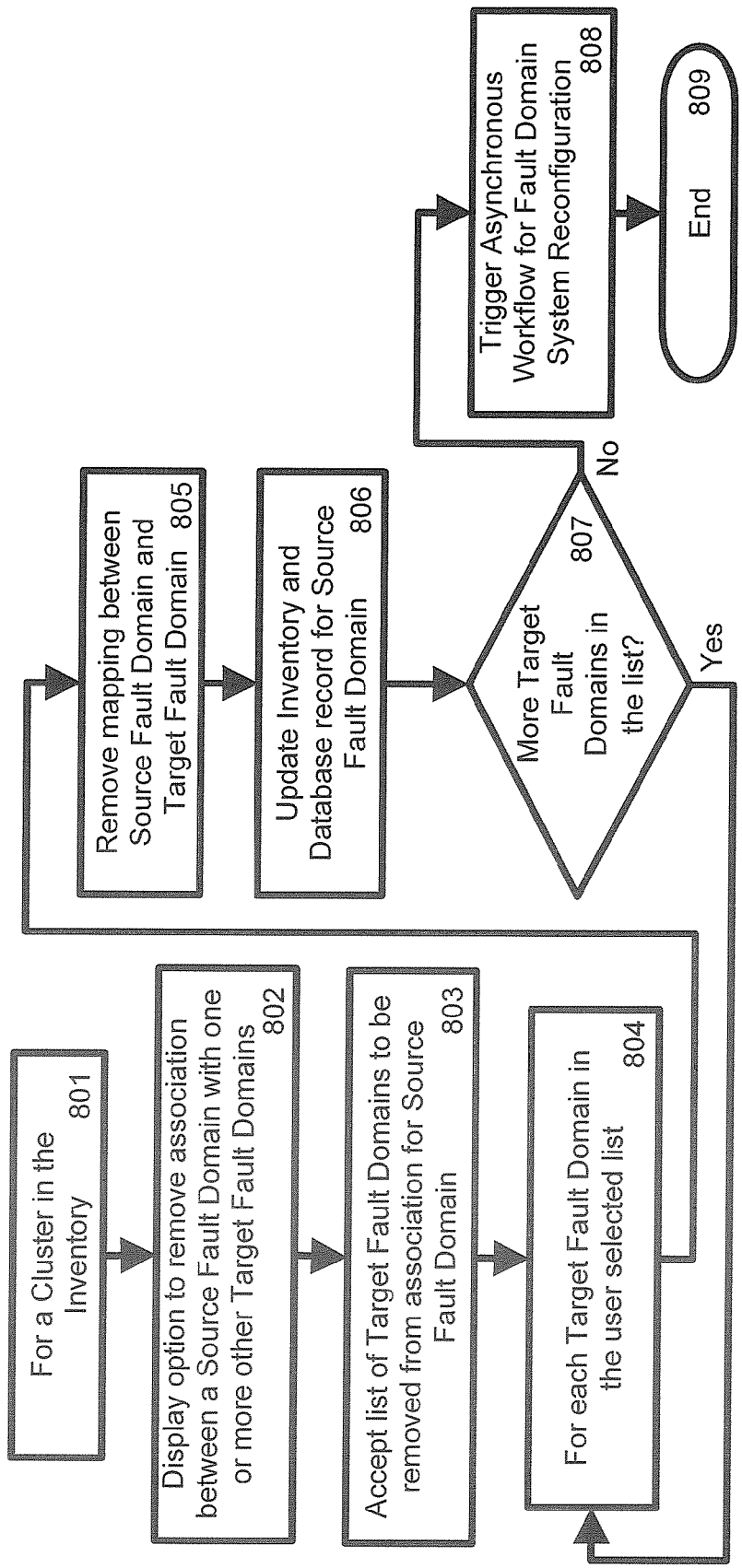
FIG. 8 is a flowchart depicting a process of removing an association between one defined fault domain and one or more other defined fault domain, according to some embodiments.

FIG. 8 is a flowchart depicting a process of removing an association between one defined fault domain and one or more other defined fault domain. The process of FIG. 8 begins with step 801, which looks at one existing cluster and then, in step 802, displays an option to remove an association from one user-selected defined fault domain, as a source fault domain, to one or more other user-selected defined fault domains, as target fault domain(s). Then, in step 803, a list or identification of one or more user-selected target defined fault domains is received as input and then, beginning with step 804 for each such selected target defined fault domain, removes a mapping between the user-selected defined fault domain, as a source fault domain, to the one or more other user-selected defined fault domains and in step 806 updates stored values for the user-selected source fault domain. A determination is then made in step 807 regarding whether there are more user-selected defined fault domains to remove from becoming or being target fault domains and, if so, the process returns to step 804. If not, then an asynchronous process for reconfiguring the fault domain system is triggered in step 808, as is explained more fully elsewhere herein, and the process finishes in step 809.

In one embodiment, the process of removing an association between one new defined fault domain and one or more other new defined fault domain is performed by engine 120 of FIG. 1.

Figure 9:
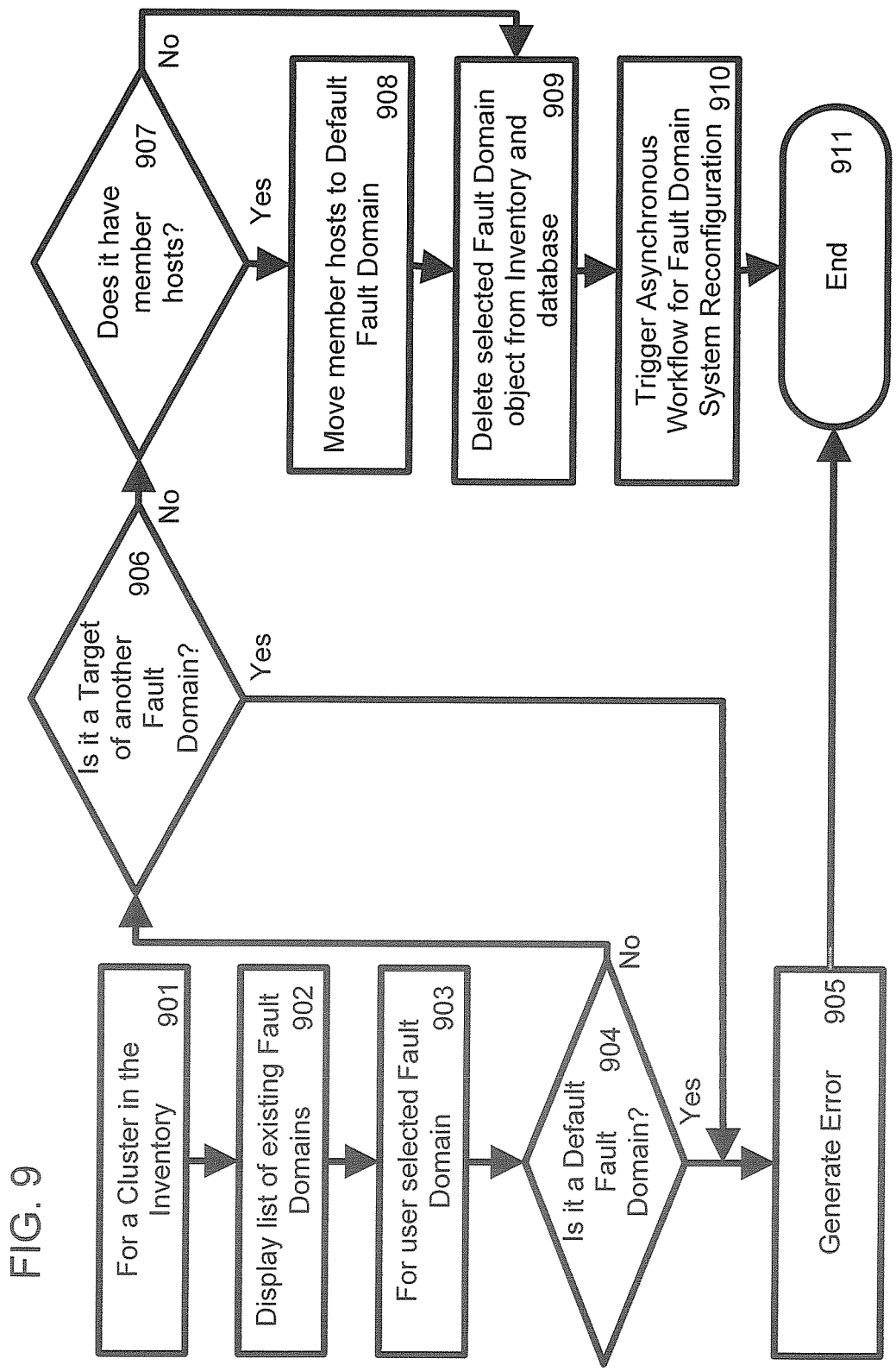
FIG. 9 is a flowchart depicting a process of deleting a defined fault domain, according to some embodiments.

FIG. 9 is a flowchart depicting a process of deleting a defined fault domain. The process of FIG. 9 begins with step 901, which looks at one existing cluster and then, in step 902, displays to a user a list of existing fault domains. Such display can be in any known form such as a selectable menu, tab or button displayed as part of a graphical user interface (GUI). Then, in step 903 for any user-selected fault domain, a determination is made in step 904 regarding whether the user-selected fault domain is a default fault domain. If the outcome of the determination in step 904 is that the user-selected fault domain is a default fault domain then an error is generated in step 905 else the process continues with step 906. In step 906, a determination is made regarding whether the user-selected fault domain is a target of another fault domain. If the outcome of the determination in step 906 is that the user-selected fault domain is a target of another fault then an error is generated in step 905 else the process continues with step 907. In step 907, a determination is made regarding whether the user-selected fault domain has any member host computing systems. If the determination in step 907 is that the user-selected fault domain does not have any member host computing systems then the process continues to step 909. Alternatively, if the determination in step 907 is that the user-selected fault domain does have one or more member host computing system then, in step 908, the one or more member host computing system is moved to the default fault domain for that cluster and stored values for that default fault domain are updated. In step 909, the user-selected defined fault domain is deleted, including any stored values of member host computing systems and of defined associations from that defined fault domain. Then, an asynchronous process for reconfiguring the fault domain system is triggered in step 910, as is explained more fully elsewhere herein, and the process finishes in step 911.

In one embodiment, the process of deleting a defined fault domain is performed by engine 120 of FIG. 1.

Figure 10:
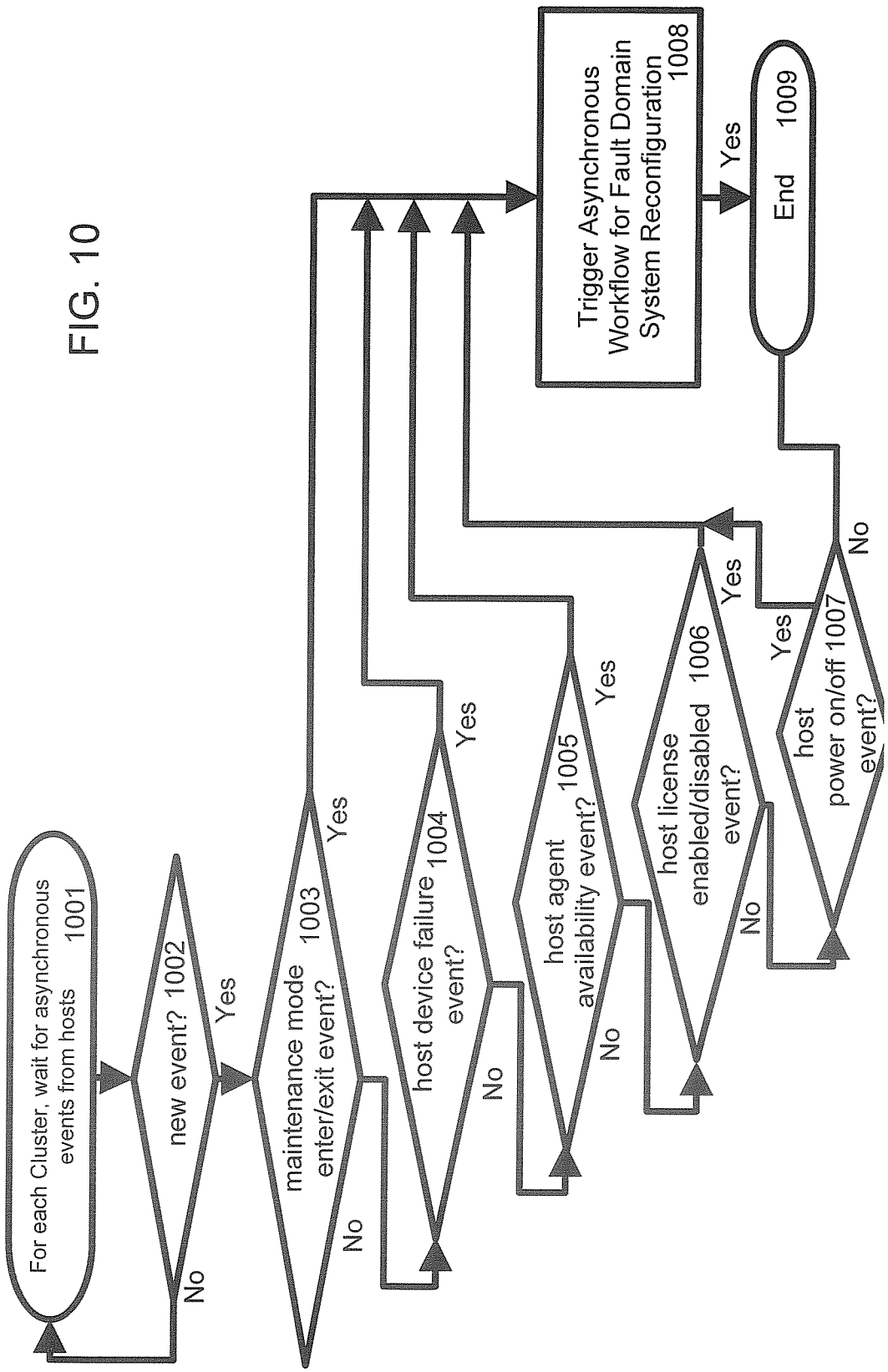
FIG. 10 is a flowchart depicting a process of fault detection, according to some embodiments.

FIG. 10 is a flowchart depicting a process of fault detection. Fault detection is a process of identifying any new asynchronous operational event that may need to trigger an asynchronous reconfiguration of the fault domain system. The process of FIG. 10 begins with step 1001, which looks at one existing cluster and waits for such asynchronous events and then, in step 1002, when it determines that a new event in that cluster has occurred, begins a process of evaluating the event. In step 1003, the event is evaluated to determine if a host computing system has entered or exited a maintenance mode thereby making the host computing system unavailable as a peer host for replication purposes. In step 1004, the event is evaluated to determine if a host computing system has experienced a failure event thereby making the host computing system unavailable as a peer host for replication purposes. In step 1005, the event is evaluated to determine if an agent running on a host computing system has experienced an availability event thereby making the agent unavailable for the communicating and coordinating activities for the host computing system to operate as a peer host for replication purposes. In step 1006, the event is evaluated to determine if a host computing system has experienced a license enable or disable event thereby making the host computing system available or unavailable, as the case may be, to operate within the data replication environment. In step 1007, the event is evaluated to determine if a host computing system has powered on or off thereby making the host available to continue or unavailable to no longer continue, as the case may be, to operate within the data replication environment. If the outcome of any of these determinations is that the evaluated event is not one of these defined types of events then the process returns to step 1001 to repeat the process. Otherwise, an asynchronous process for reconfiguring the fault domain system is triggered in step 1008, as is explained more fully elsewhere herein, and the process finishes in step 1009.

In one embodiment, the process of fault detection is performed by engine 120 of FIG. 1.

Figure 11A:
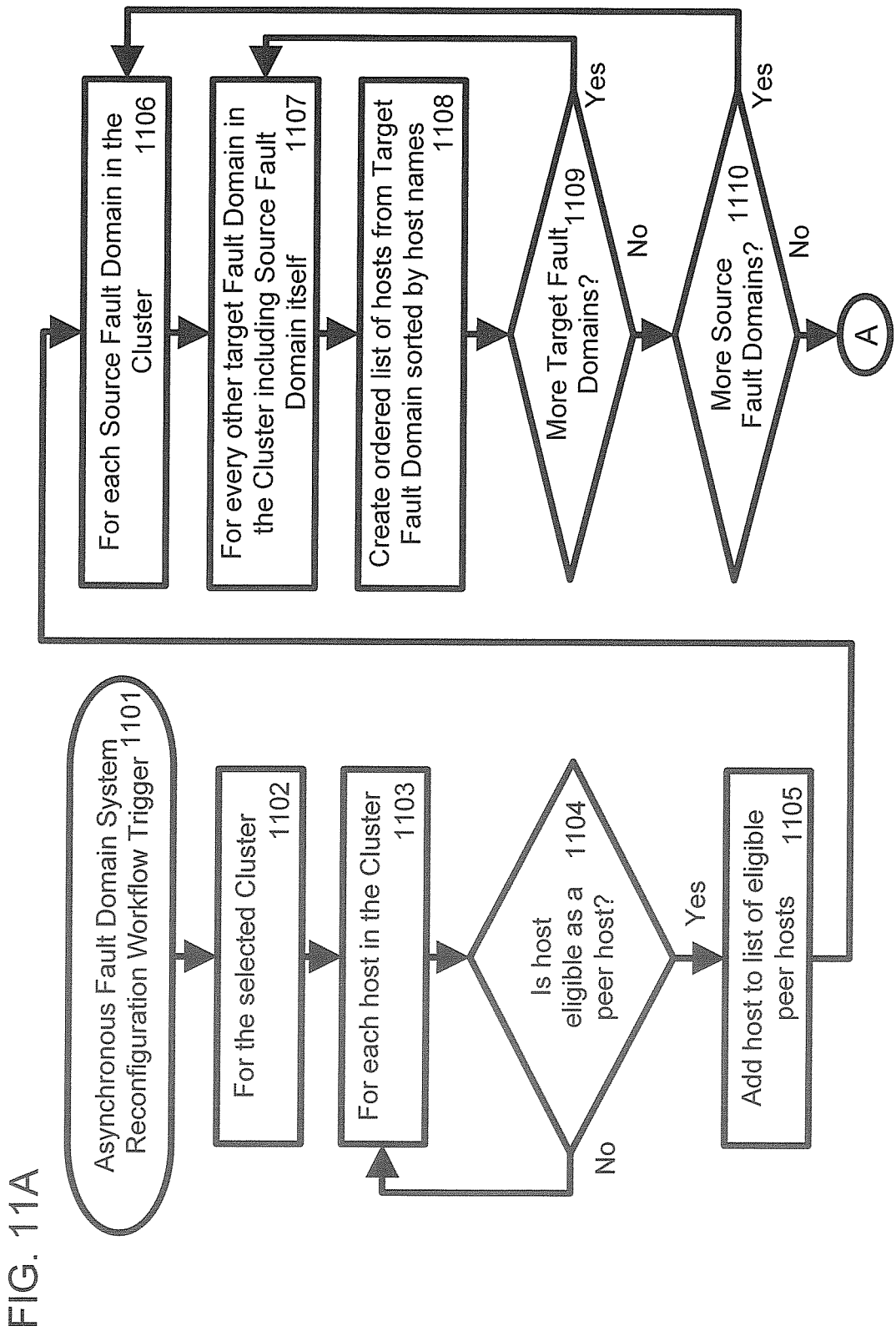
FIG. 11A and FIG. 11B are flowcharts depicting a process of determining a new fault domain system configuration, according to some embodiments.
Figure 11B:
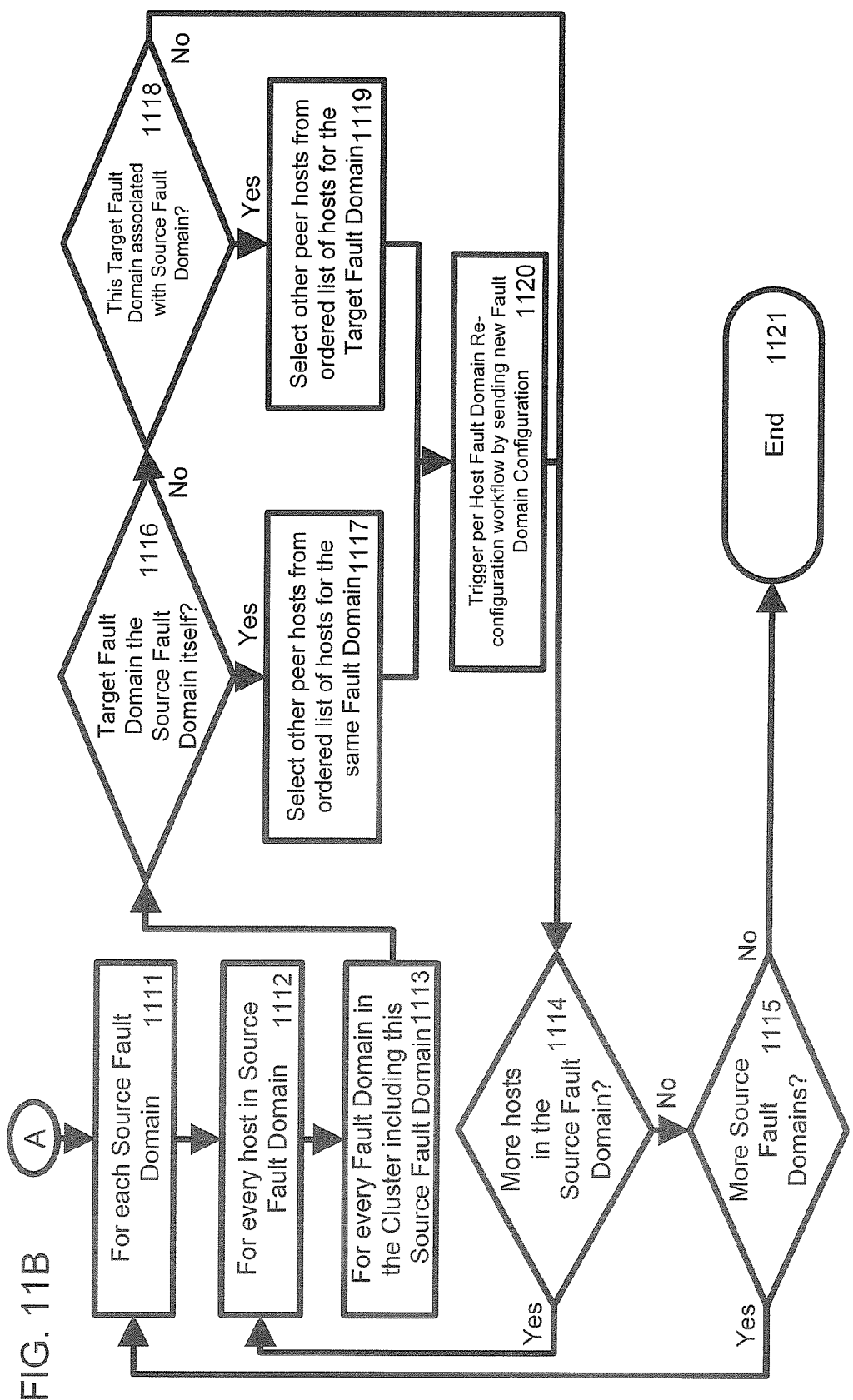

FIG. 11A and FIG. 11B are flowcharts depicting a process of determining a new fault domain system configuration. This process operates asynchronously in that it can be triggered by any of the above-described operations, which may themselves occur asynchronously during the fault domain and replication process. The reconfiguration process begins with step 1101 in which an asynchronous trigger from any of the above-described processes is received. Receiving such a trigger then moves to step 1102 to look at the cluster from which the trigger was received, and then moves to step 1103 to look at each host computing system in that cluster. A determination is made in step 1104 for each such host computing system regarding whether that host is eligible as a peer host for replication purposes.

In one embodiment, a host computing system is considered eligible to operate as a peer host for another host computing system if it: has an agent running on that host computing system, is set to allow communications over the network connecting the host computing systems, has cache system acceleration enabled, has random access memory (RAM) or a FLASH memory device added to the same cluster as the other host computing system, shares the same virtual machine file system or network file system datastore as the other host computing system, is not in maintenance mode, and is not in a "disconnected" or in a "not responding" state in the management server. It is to be understood that this list of eligibility requirements may vary as desired in a given implementation.

If the determination in step 1104 is that a host computing system in the cluster is eligible to operate as a peer host then, in step 1105, that host computing system is added to a list of eligible peer hosts. The process continues with step 1106, which looks at each source fault domain (that is, each defined fault domain that has a defined association to another, target, defined fault domain) and then, in step 1107, looks at each of those target defined fault domains as well as this source fault domain operating as a source fault domain, in order to create, in step 1108, an ordered list of host computing systems to be candidates for data replication. In one embodiment the ordered list is based on the host computing system names however alternative approaches using known techniques can also be used to create the ordered list. Regardless of approach used, it is to be understood that the created ordered list of host computing systems to be candidates for data replication is therefore unique to each host computing system. A determination is made in step 1109 regarding whether there are more target fault domains to consider in steps 1107 and 1108 else the process continues with step 1110 to determine whether there are more source fault domains to consider in step 1106. If the determination is made in step 1110 that there are no more source fault domains then the process, in step 1111, looks at each source fault domain and, in step 1112, looks at each host computing system within the respective source fault domain and, in step 1113, for every fault domain in the cluster including the respective source fault domain, makes a determination in step 1116 regarding whether the target fault domain is the respective source fault domain itself, in which case the process continues to step 1117, where a selection is made of other peer hosts from the ordered list of host computing systems for the same fault domain, else the process continues by making a determination in step 1118 regarding whether the target fault domain is associated with the respective source fault domain, in which case the process continues to step 1119, where a selection is made of other peer hosts from the ordered list of host computing systems for the target fault domain. Either way, the process in step 1120 then triggers each host computing system to perform a reconfiguration by communicating this newly defined fault domain configuration, as is explained more fully elsewhere herein. The process then returns to step 1114 to determine whether there are more hosts in the source fault domain, in which case the process returns to step 1112, otherwise a determination is made in step 1115 regarding whether there are more source fault domains. If there are more source fault domains then the process returns to step 1111 otherwise the process then finishes in step 1121.

In one embodiment, the process of defining a new fault domain configuration is performed by engine 120 of FIG. 1.

Figure 12:
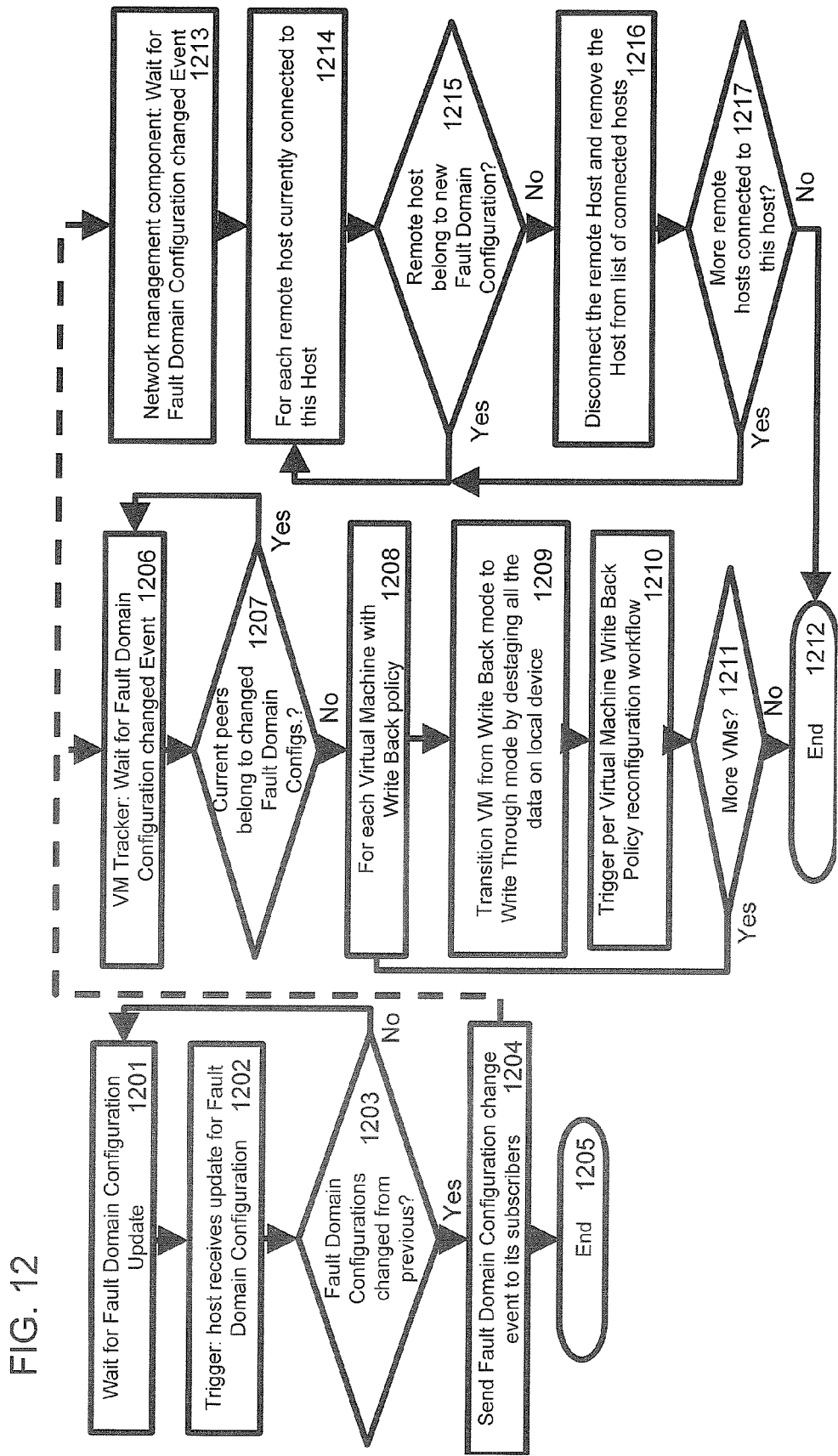
FIG. 12 is a flowchart depicting a process of reconfiguring fault domains on a per-host computing system basis, according to some embodiments.

FIG. 12 is a flowchart depicting a process of reconfiguring fault domains on a per-host computing system basis. The process begins in step 1201 of a host computing system waiting to receive an updated or newly defined fault domain configuration (e.g., the output of the process of FIG. 11). When a host computing system receives an updated or new fault domain configuration in step 1202 then a determination is made in step 1203 regarding whether the received fault domain configuration has changed from a previously received fault domain configuration. If there is no change in the fault domain configuration then the process returns to step 1201 otherwise the process continues with step 1204 by sending out a fault domain configuration change event which, in an embodiment, is a communication to an agent running on the host computing system.

While waiting in step 1206, when a virtual machine tracker portion of the agent running on the host computing system receives the communication from step 1204, a determination is made in step 1207 regarding whether the currently specified peer hosts for the host computing system are in the updated or newly defined fault domain configuration, in which case the process returns to waiting step 1206.

Otherwise, the process continues with step 1208 where, for each virtual machine currently operating in a write back cache mode, the virtual machine is transitioned in the cache system from the write back cache mode to a write through mode by destaging all the data on the local device and, in step 1210, a per virtual machine write back policy reconfiguration is triggered as explained more fully elsewhere herein. A determination is then made in step 1211 regarding whether there are more virtual machines in which case the process returns to step 1208 otherwise ending in step 1212.

While waiting in step 1213, when a network management component portion of the agent running on the host computing system receives the communication from step 1204, the process continues in step 1214 where for each remote host currently connected to the host computing system, a determination is made in step 1215 regarding whether the remote host belongs to the update or newly defined fault domain configuration and if it does then returns to the process of step 1214 otherwise, in step 1216, the remote host is disconnected from the host computing system and is removed from a list of connected hosts. The process then continues with step 1217 where a determination is made regarding whether there are more remote hosts connected to this host and, if there are, then the process returns to step 1214 otherwise the process ends with step 1212.

Figure 13:
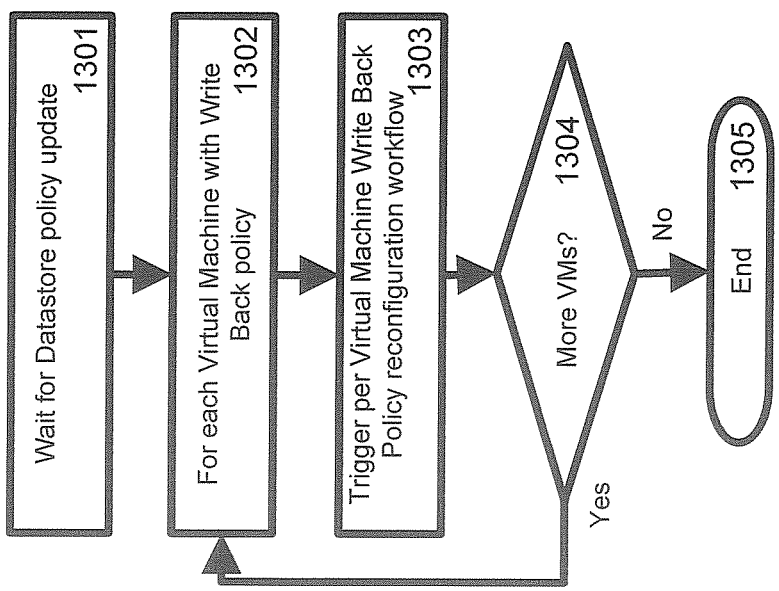
FIG. 13 is a flowchart depicting a process of reconfiguring write back cache policies on a per datastore basis, according to some embodiments.

FIG. 13 is a flowchart depicting a process of reconfiguring write back cache policies on a per datastore basis. A datastore policy update is waited for in step 1301. As would be understood by one of skill in the art in light of the teachings herein, a datastore policy may be updated by a user at any time regarding, for example, which caching algorithm is to be used, which updated policy would then apply to all virtual machines using that datastore. Then, in step 1302, for each virtual machine operating with a write back cache policy, a per virtual machine write back policy reconfiguration process is triggered in step 1303. A determination is then made, in step 1304, regarding whether there are more virtual machines, in which case the process returns to step 1302, else it finishes in step 1305.

Figure 14B:
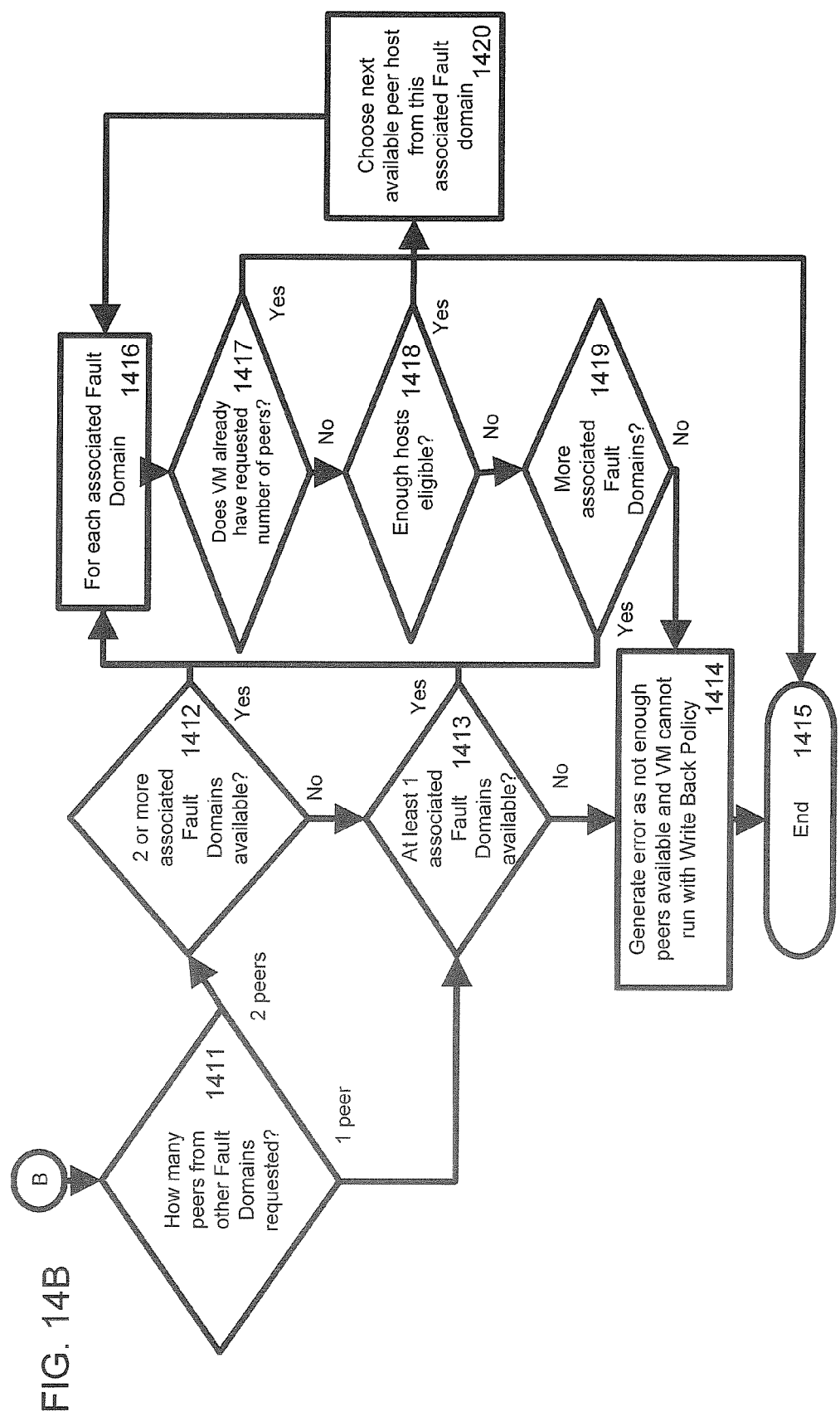

FIG. 14A and FIG. 14B are a flowcharts depicting a per virtual machine process of fault domain reconfiguration based on a write back policy update or a fault domain reconfiguration triggering event, which are waited for in step 1401. A determination is made in step 1402 regarding whether the received new policy is a write back policy and the process returns to waiting in step 1401 if it is not. Conversely, if the new policy is a write back policy then the process continues with a determination in step 1403 regarding whether the virtual machine should use peer hosts from the same fault domain. If the virtual machine should use peer hosts from the same fault domain then, in step 1404, a determination is made regarding whether the requested number of peers from the same fault domain are already chosen. If the outcome of the determination in step 1403 is that virtual machine should not use peer hosts from the same fault domain or the outcome of the determination in step 1404 is that the requested number of peers from the same fault domain are already chosen then the process continues with step 1407. Alternatively, if the outcome of the determination in step 1404 is that the requested number of peers from the same fault domain have not already been chosen then the process continues with step 1405. In step 1405 a determination is made regarding whether there are enough eligible host computing systems available to meet the requested number of peers from the same fault domain. If the outcome of the determination in step 1405 is that there are enough eligible hosts then the process continues with step 1406 to find this hosts fault domain and choose the next available host in the same fault domain as the local peer. Alternatively, if the outcome of the determination ins step 1405 is that there are not enough eligible host then the process continues with step 14098 where an error is generated because there are not enough peer hosts available and therefore the virtual machine cannot run with a write back policy. Returning to the discussion above from either determination step 1403 or determination step 1404, in step 1407 a determination is made regarding whether the virtual machine or its datastore should use peer hosts from other fault domains and if not then in step 1408, the policy setting of this virtual machine is changed to either the combination of a write back followed by write through cache approach or no cache approach, as desired in a given implementation, and the process ends at step 1410. Alternatively, if the determination in step 1407 is that the virtual machine or its datastore should use peer hosts from other fault domains then the process continues to step 1411 where a determination is made regarding how many (e.g., 0, 1 or 2) peer hosts from other fault domains were specified in the user's data policy. If more than one peer host from other fault domains were requested then, in step 1412, a determination is made regarding whether there are two or more associated fault domains and, if so, for each associated fault domain in step 1416, a determination is made in step 1417 regarding whether the virtual machine already has the requested number of peers. If the outcome of the determination in step 1417 is that the virtual machine does already have the requested number of peers then the process continues to step 1420 to choose the next available peer host from this associated fault domain and turn to step 1416 for the next associated fault domain. Alternatively, if the outcome of the determination in step 1417 is that the virtual machine does not already have the requested number of peers then the process continues to step 1418 where a determination is made regarding whether there are enough eligible hosts and, if so, the process continues to step 1420 as has been described. If not, then the process continues to step 1419 where a determination is made regarding whether there are more associated fault domains and if so returns to step 1416 and the process continues as has been described. Alternatively, the process continues to step 1414 to generate an error because there are not enough peer hosts available and therefore the virtual machine cannot run with a write back policy. Returning to determination step 1411, if the determination made is that more than one peer host from other fault domains was not specified in the user's data policy, or if the determination made in step 1412 was made that two or more associated fault domains were not available, then the process continues by making a determination in step 1413 regarding whether there is at least one associated fault domain available and, if there is the process continues to step 1416 otherwise an error is generated in step 1414 as has been described and the process again finishes in step 1415.

In one embodiment, the process of defining a new fault domain configuration is performed by engine 120 of FIG. 1.

Figure 15:
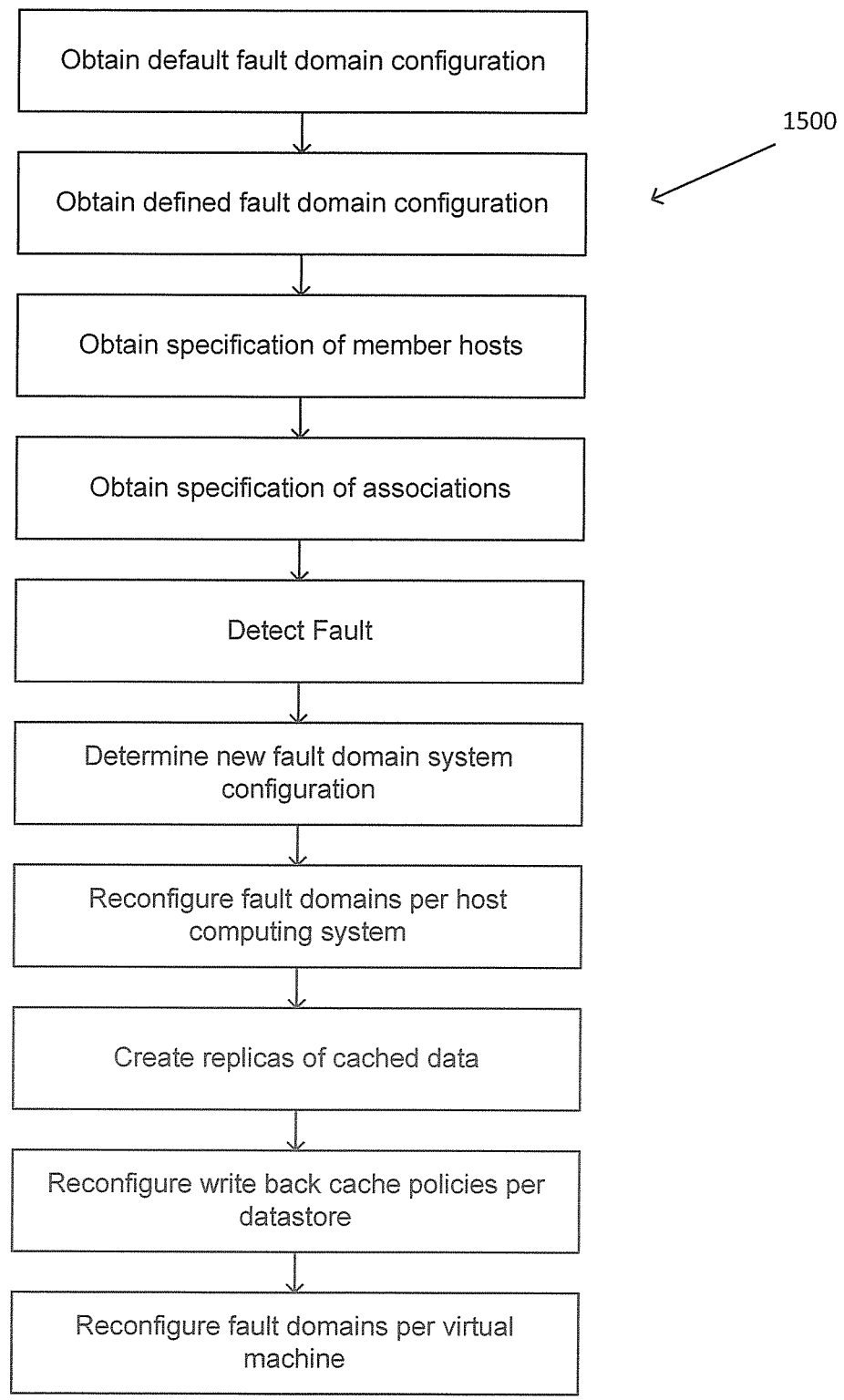
FIG. 15 is a flowchart depicting an overall process of the fault domain system and approach, according to some embodiments.

FIG. 15 is a flowchart depicting an overall process of operation 1500 of the fault domain system and approach as described herein. In step 1501, a default fault domain configuration is obtained, as may occur via the process described and shown with reference to FIG. 3. In step 1502, a defined fault domain configuration is obtained, as may occur via the process described and shown with reference to FIG. 4 and/or FIG. 9. In step 1503, specification of one or more member hosts in a fault domain configuration is obtained, as may occur via the process described and shown with reference to FIG. 5 and/or FIG. 6. In step 1504, specification of associations between fault domains is obtained, as may occur via the process described and shown with reference to FIG. 7 and/or FIG. 8. In step 1505, a relevant fault is detected, as may occur via the process described and shown with reference to FIG. 10. In step 1506, a new fault domain system configuration is determined, as may occur via the process described and shown with reference to FIG. 11A and FIG. 11B. In step 1507, a process of reconfiguring fault domains on a per-host computing system basis is performed, as may occur via the process described and shown with reference to FIG. 12. In step 1508, replicas are created in accordance with the peer host determinations made via the various processes described herein. In step 1509, a process of reconfiguring write back cache policies on a per datastore basis is performed, as may occur via the process described and shown with reference to FIG. 13. In step 1510, a per virtual machine process of fault domain reconfiguration based on a write back policy update is performed, as may occur via the process described and shown with reference to FIG. 14A and FIG. 14B. The process of FIG. 15 then returns to step 1501. Further, it is to be understood that, as with many of the asynchronous processes described herein, the creating of replicas in step 1508 can also be performed outside of the sequence shown in the figure and, as a result, one or more of these various processes may occur before, during or after another of these various processes, as would be understood by one of skill in the art in light of the teachings herein.

Using the methods and systems described herein, replicas of cached data can be made in accordance with a user's defined data policy without the user having to be aware of the physical topology of the host computing systems, without the user having to update the data policy when there is a change to that physical topology, and without the user having to be aware of which host computing system their virtual machine is presently operating on. Instead, the methods and systems described herein determine where replicas are to be made based on the user's defined data policy, the default and defined fault domains, and a current operational state of the overall system which includes handling faults such as device failures or host computing system failures in which case alternate eligible peer host computing systems are chosen without requiring user intervention.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art. For example, while various embodiments were described as using or including a GUI, a command line interface (CLI) could likewise be used for any or all of such user input interactions as would be understood by one of skill in the art in light of the teachings herein. As a further example, it is to be understood that use herein of the term "user" or "administrator" is not intended to be limited to a single individual user or administrator.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
obtaining, by a computing system, a default fault domain configuration;
obtaining, by the computing system, a configuration of one or more defined fault domain;
obtaining, by the computing system, a specification of one or more host as a member in the one or more defined fault domain;
obtaining, by the computing system, a specification of an association between fault domains of the defined fault domain configuration;
detecting, by the computing system, an operating fault;
determining, by the computing system and based on the detected operating fault, a new fault domain system configuration;
reconfiguring on a per host basis, by the computing system and based on the new fault domain system configuration, a specification of which of one or more hosts are to be used for data replication,
performing data replication, by the computing system, based on the reconfigured specification of which of the one or more hosts to use for data replication;
reconfiguring write back cache data policies, by the computing system, based on receipt by the computing system of a datastore policy update;
newly reconfiguring, by the computing system and based on an update to a write back data policy, the specification of which of the one or more hosts are to be used for data replication; and,
performing data replication, by the computing system, based on the newly reconfigured specification of which of the one or more hosts to use for data replication.

2. The method of claim 1 wherein obtaining, by the computing system a default fault domain configuration is performed by the computing system creating the default fault domain and placing hosts in a cluster in the created default fault domain.

3. The method of claim 1 wherein obtaining, by the computing system, the configuration of one or more defined fault domain is performed by the computing system creating the one or more defined fault domain each with a given name received as input from a user.

4. The method of claim 1 wherein obtaining, by the computing system, a specification of one or more member host as a member in the one or more defined fault domain is performed by the computing system adding one or more user-selected host to the one or more defined fault domain.

5. The method of claim 1 wherein obtaining, by the computing system, a specification of an association between fault domains of the defined fault domain configuration is performed by the computing system receiving as input a user-selection of the association.

6. The method of claim 1 wherein detecting, by the computing system, an operating fault is performed by the computing system detecting: a host entering or exiting a maintenance mode event, a host failure event, a host availability event, a host license enable or disable event, or a host power on or off event.

7. The method of claim 1 wherein determining, by the computing system and based on the detected operating fault, a new fault domain system configuration is performed by the computing system creating a set of ordered lists of hosts sorted by host name, one for each source fault domain in a cluster, and selecting peer hosts from the set of ordered lists.

8. The method of claim 1 wherein reconfiguring on a per host basis, by the computing system and based on the new fault domain system configuration, a specification of which of one or more hosts are to be used for data replication is performed by the computing system transitioning a virtual machine from write back cache mode to write through cache mode by destaging data on a local device to the computing system if current peers do not belong to the new fault domain system configuration and disconnecting host connections for hosts not included in the new fault domain system configuration.

9. The method of claim 1 wherein newly reconfiguring, by the computing system and based on an update to a write back data policy, the specification of which of the one or more hosts are to be used for data replication is performed by the computing system determining that peer hosts from another one of the one or more fault domains should be used and then choosing available peer hosts based on how many peer hosts were requested by the user with respect to how many peer hosts were previously specified by the computing system.

10. A method comprising:
determining which host computing systems in a cluster are to be used for replicating data between the host computing systems in the cluster based on:
a set of user-specified defined fault domains wherein each defined fault domain includes one or more host computing system as a user-specified member;
a system-determined default fault domain wherein the default domain includes all host computing systems not included in one of the defined fault domains as a user-specified member;
a user-specified set of associations between the defined fault domains wherein each association defines a unidirectional relationship between one of the defined fault domains as a source of data to be replicated and another of the defined fault domains as a target of data to be replicated; and,
a user-specified data policy wherein the data policy specifies how many data replicas are to be made to a local peer host and how many data replicas are to be made to a remote peer host;
replicating data between the host computing systems according to the determination of which host computing systems are to be used for data replication;
repeating the step of determining when:
a new set of defined fault domains is specified by a user;
a new set of associations is specified by a user;
a new data policy is specified by a user; or,
an operational fault in one of the host computing systems is detected;
and,
repeating the step of replicating data.

11. The method of claim 10 where the local peer host is one of the host computing systems that is included as a user-specified member in one of the set of defined fault domains that also includes as a user-specified member another of the host computing systems from which data is to be replicated.

12. The method of claim 10 where the remote peer host is:
one of the host computing systems that is not included as a user-specified member in one of the set of defined fault domains that includes as a user-specified member another of the host computing systems from which data is to be replicated;
and,
the user specified set of associations includes an association between the one of the set of defined fault domains that includes as a user-specified member the another of the host computing systems and the another one of the set of defined fault domains that includes as a user-specified member the one of the host computing systems.

13. The method of claim 10 where the step of determining is performed by generating a unique ordered list of the host computing systems for each of the host computing systems.

* * * * *